United States Patent
Castelli et al.

(10) Patent No.: US 9,510,506 B2
(45) Date of Patent: Dec. 6, 2016

(54) MOWER-MOUNTED TRIMMER

(71) Applicants: Laurence J. Castelli, Spring Valley, IL (US); David J. Sickley, Peru, IL (US)

(72) Inventors: Laurence J. Castelli, Spring Valley, IL (US); David J. Sickley, Peru, IL (US)

( * ) Notice: Subject to any disclaimer, the term of this patent is extended or adjusted under 35 U.S.C. 154(b) by 0 days.

(21) Appl. No.: 13/974,423

(22) Filed: Aug. 23, 2013

(65) Prior Publication Data

US 2015/0052867 A1    Feb. 26, 2015

Related U.S. Application Data

(60) Provisional application No. 61/743,604, filed on Sep. 7, 2012, provisional application No. 61/744,238, filed on Sep. 21, 2012.

(51) Int. Cl.
*A01D 34/00* (2006.01)
*A01D 34/416* (2006.01)
*A01D 34/84* (2006.01)

(52) U.S. Cl.
CPC .......... *A01D 34/4165* (2013.01); *A01D 34/84* (2013.01)

(58) Field of Classification Search
CPC ..................................................... A01D 34/84
USPC ............... 56/12.7, 13.7, 16.9, 17.5, 256
See application file for complete search history.

(56) References Cited

U.S. PATENT DOCUMENTS

| | | | | |
|---|---|---|---|---|
| 3,019,844 A | * | 2/1962 | Key | 172/15 |
| 3,197,951 A | * | 8/1965 | Zick | 56/255 |
| 3,531,922 A | * | 10/1970 | Hansen | 56/13.7 |
| 3,686,839 A | * | 8/1972 | Lambert | 56/11.6 |
| 3,782,085 A | * | 1/1974 | Parker et al. | 56/11.6 |
| 3,803,818 A | * | 4/1974 | Chaney | 56/11.6 |
| 4,170,099 A | * | 10/1979 | Owens | 56/16.9 |
| 4,453,372 A | * | 6/1984 | Remer | 56/13.7 |
| 4,718,221 A | * | 1/1988 | Wessel et al. | 56/16.9 |
| 5,159,803 A | * | 11/1992 | Earley, Jr. | 56/12.7 |
| 8,464,504 B1 | * | 6/2013 | Huff | 56/12.7 |
| 2002/0100266 A1 | * | 8/2002 | Greenwell | 56/12.7 |
| 2003/0230065 A1 | * | 12/2003 | Hennum | 56/12.7 |
| 2004/0045268 A1 | * | 3/2004 | Nafziger | 56/10.4 |
| 2004/0237491 A1 | * | 12/2004 | Heighton et al. | 56/12.7 |
| 2006/0005520 A1 | * | 1/2006 | Weidman | 56/12.7 |
| 2007/0130901 A1 | * | 6/2007 | McMahan | 56/13.7 |

\* cited by examiner

*Primary Examiner* — Robert Pezzuto
*Assistant Examiner* — Mai Nguyen

(57) ABSTRACT

The present invention involves a multiply adjustable, obstacle responsive mower deck mounted "edge" trimmer that is easily adjustable, easily maintained and stored, low-profile, and requires no outside power source.

8 Claims, 4 Drawing Sheets

MOWER-MOUNTED TRIMMER

FIELD OF THE INVENTION

The present invention involves a multiply adjustable, obstacle responsive mower deck mounted "edge" trimmer that is easily adjustable, easily maintained and stored, low-profile, and requires no outside power source.

SUMMARY OF THE INVENTION

The present invention is a lawn mower/tractor deck-mountable trimmer allowing the user to edge an area extending from the edge of the deck. This allows the user, while using the mower, to edge trim areas formerly requiring the user to dismount and utilize a hand-held trimmer in the area where the mower could not reach. These areas include, for example (but not limited to) under the edge of a fence, around trees, driveway edges etc. The dual task inefficiently required additional time, effort, and separate equipment, creating a real need in the area for a device that could combine both tasks efficiently in a low cost manner.

The state of the current art in the area fails to provide a deck-mountable apparatus that is height adjustable to differing decks, easily adjustable in extension length of the trimmer, and easily liftable for access to the underside of the trimmer head for routine maintenance and storage.

The current invention solves these problems by providing a mower deck-mountable trimmer attachment having a trimmer head with an attachment bracket having two sections. The section connected to a trimmer head and the second to mower deck. The sections joined together through attachment means which allows adjustability along a curve. This allows the attachment bracket to be extensible along a radius, thereby altering the cutting area or the length of the trimmer from the mower. At an end of the bracket section that attaches to the mower deck, an adjustable attachment allows the user to raise and lower the trimmer head height by extending the length along the attachment, usually by a slot or a selection of bores affixed by screws, nuts and bolts, or pins. Alternately, the height can be fixed. The bracket portion that attaches to the mower deck preferably affixes by extending that bracket portion along the mower deck and providing a bend in the bracket portion to run alongside the height of the deck. Alternately, the deck-affixing portion of the bracket can be affixed only to the side wall (height) of the deck.

To fix the problem of storage, a hinge can be provided in the mower deck affixing section of the bracket. Preferably, this will be disposed between a segment flush with the upper surface of the deck and one flush with the side wall. Even on hinged embodiments, height adjustment can be provided in the bracket section along the side wall of the deck as described above and herein, again, utilizing screws, nuts and bolts and pins or other means known in the art.

Regardless of whether the embodiment utilizes an extension along the upper deck of the mower on that portion of the bracket, after extending along the side wall of the deck, the bracket comprises an additional bend to form an upper or lower surface to receive the second section of the bracket, the one that attaches to the trimmer head.

A pin is disposed through both bracket sections at this point, connecting them rotatably. Preferably, one of either bracket section will contain additional radially distributed bores for receipt of a pin disposed through a bore or bores in the remaining section. This allows the user to fix the radial length. A clevis pin or other connector known in the art may be used. Different radial lines may be drilled on a bracket section with related altered lengths along the other section may be utilized to effect different radial and extension lengths.

For safety, a spring attachment of the trimmer head can be used. This device provides a spring attachment bar extending perpendicularly from a planar surface of the trimmer head attachment bracket section which preferably has a bore/hole for receipt of the spring and or bolts and bushings that are securely welded to the inside of the spring.

Unlike some, this mower deck mountable trimmer attachment apparatus is preferably electrically connected to a battery of a mower and additionally preferably has a switch and at least one fuse.

BACKGROUND OF THE INVENTION

Figure 1:
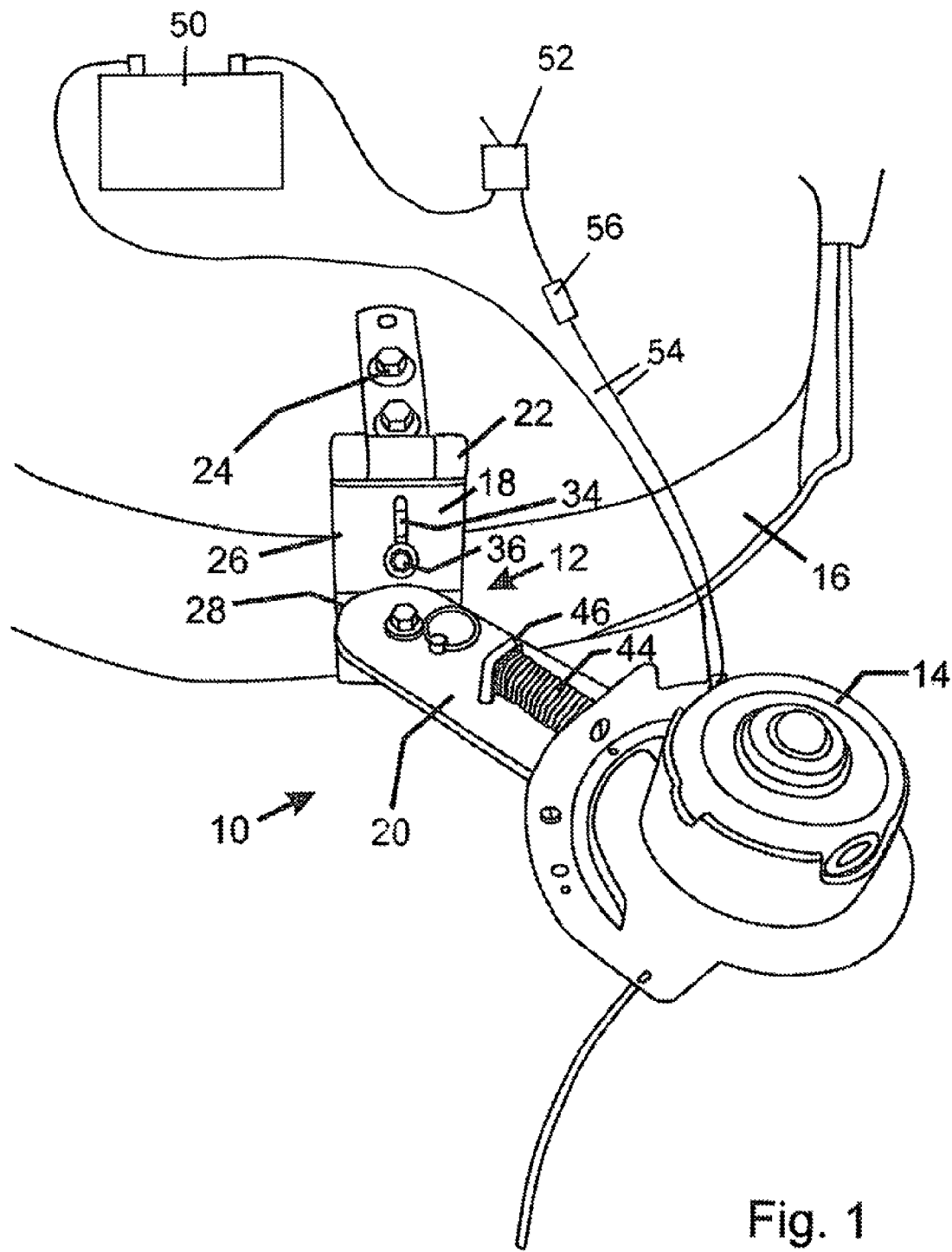
FIG. 1 depicts an side view of an embodiment of the invention showing the combination rotatable bracket of the invention disposed on an existing mower deck, displaying rotation of the trimmer attachment portion of the bracket around a pivot connection to the mower deck portion of the bracket, and a trimmer head disposed on the trimmer attachment portion of the bracket.

The present invention is a lawn mower/tractor deck-mountable trimmer allowing the user to edge an area extending from the edge of the deck. This allows the user to, while using the mower, to edge trim areas formerly requiring the user to dismount and utilize a hand-held trimmer in the area where the mower could not reach. These areas include, for example (but not limited to) under the edge of a fence, around trees, driveway edges, etc. The dual task inefficiently required additional time, effort, and separate equipment, creating a real need in the area for a device that could combine both tasks efficiently in a low cost manner.

Lawn mowers and trimmers are universally known in the art in their separate configurations. Further, the idea of a deck-mounted trimmer on a mower is known in the art, including, but not limited to U.S. Pat. No. 2,663,137 to Asbury, U.S. Pat. No. 3,192,693 to Bergeson, U.S. Pat. No. 3,812,917 to Strate, U.S. Pat. No. 3,871,160 to Hooper, U.S. Pat. No. 3,407,579 to Decker, U.S. Pat. No. 4,453,372 to Remer, U.S. Pat. Nos. 4,170,099 and 4,642,976 to Owens. However, the existence of such a device in other than the patent literature is far less ubiquitous. These devices, currently known to skilled artisans through patent literature, are all lacking in actual functional utility, ease of use, or are cost-prohibitive for manufacture or in application. More troublesome is that most of these devices are intended to be incorporated in the manufacture of new mowers. Few are available to the average consumer through either actual availability of devices incorporating them or because they are only incorporated in very heavy duty, cost-prohibitive devices.

Therefore, the need for a deck-mounted trimmer that works well, incorporates real safety features, is easy to use, manufacture, and apply to existing mowers is clear. The apparatus described herein can be applied as an add-on feature to an existing mower deck or, in the future, incorporated in the retail mower itself. The ease of application of the device to a mower deck for an existing device can, however, be easily appreciated.

Trimmer devices applied to mowers, in general, such as U.S. Pat. No. 6,032,443 to Aldrich, and U.S. Pat. No. 6,966,168 to Kerr typically merely provide methods of applying existing handheld trimmer devices to mower decks after manufacture. Moving up the line of improvement, U.S. Pat. No. 6,381,936 to Lin removes the long handle and inserts the trimmer under the deck of the mower. Finally, more sophisticated devices such as the trimmer disclosed in U.S. Pat. No. 6,094,896 to Lane, U.S. Pat. No. 7,334,387 to Miller, and U.S. Pat. No. 7,165,383 to Luton actually fixedly apply a trimmer to the deck of the mower, extending the device outside of the mower's path, but providing no flexibility on the depth of the cutting path of the trimmer, with the exception of U.S. Pat. No. 6,397,573 to Roundy et al. which discloses two fixed length arms pivoting around a fixed axis utilizing a control bar and spring to extend the outer arm from the axis, having complete rigidity around the connection to the deck, denying access to the underside of the trimmer without removing the device or flipping the entire mower onto its side. The state of the current art in the area fails to provide a deck-mountable apparatus that is height adjustable to differing decks, easily adjustable in extension length of the trimmer, and easily liftable for access to the underside of the trimmer head for routine maintenance and storage.

DESCRIPTION OF A PREFERRED EMBODIMENT

The present invention comprises a novel mower deck-mounted "edge" trimmer apparatus. More particularly, it involves a specialized essentially two sectioned bracket attachment of a trimmer head to an existing mower deck.

The preferred embodiment of the trimmer attachment invention 10 comprises an essentially two sectioned bracket attachment 12 of a trimmer head 14 to an existing mower deck 16 as shown in FIG. 1. The bracket 12 comprises two segments, a second attachment bracket section or deck attachment piece 18, and a first attachment bracket section or trimmer head attachment piece 20. All pieces are comprised of materials known in the art of sufficient tensile strength and durability for attachment of the weight of the trimmer head and outdoor use, typically a stainless or plated metal, but also including other materials known in the industry, including but not limited to heavy duty plastics.

Deck attachment piece 18 comprises attachment means known in the art, such as but not limited to screws, nuts and bolts, pins, and, for permanent attachment, welds between an upper deck attachment segment 24 of deck attachment piece 18 placed along a top surface of deck 16. Deck attachment piece 18 additionally preferably comprises hinge 22 between upper deck attachment segment 24 and deck attachment piece deck-side extension portion 26 extending from an preferably essentially 90° bend in deck attachment piece 24 (preferably at hinge 22 in embodiments including a hinge) and extends to a low point at a level distance equal to or slightly lower than the mower deck's bottom edge or at any distance between such bottom edge and the upper surface of the mower deck, or depending on the adjustable length of the deck attachment piece deck-side extension portion 26, at a level distance at any point higher or lower than the bottom edge of the mower deck 16 based on the application. At such low point, deck attachment piece 18 effects an essentially 90° bend extending outward from and essentially perpendicular to the side of mower deck 16 to form a trimmer head attachment piece base 28 upon whose upper surface trimmer head attachment piece 20 is disposed.

Figure 2:
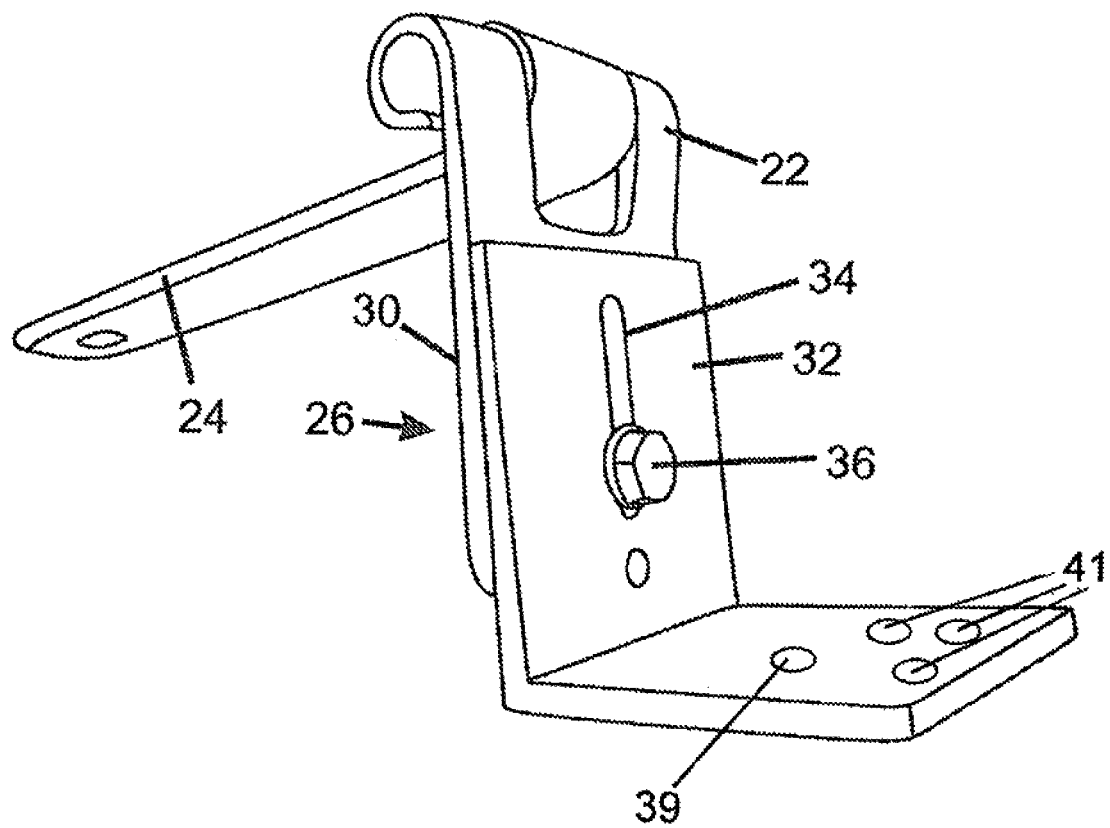
FIG. 2 depicts a side view of deck attachment section of the bracket of the invention, specifically showing a deck upper surface attachment segment, hinge, a fixed segment, and a non-fixed segment with an elongated bore to adjust the length of the deck attachment segment in relation to height of the deck of the mower.

In additional preferred embodiments, as shown in FIG. 2, the bracket has, at its connection, two planar parallel pieces, wherein fixed piece 30 is of a piece with hinge 22, formed in conjunction with and rotatably joined to the hinge portion of deck attachment piece 24, and a second, non-fixed piece 32 is disposed in a parallel manner thereon and contains an elongated bore 34 extending vertically within the piece. An attachment pin 36 or other connecting piece known in the art allows the user to extend the length of deck attachment piece between deck-side extension 26 and trimmer attachment piece 20.

Figure 3:
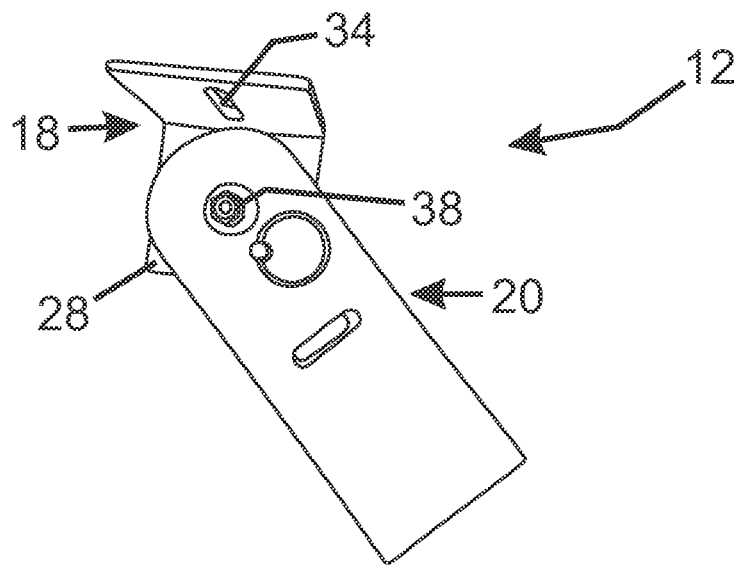
FIG. 3 depicts an overhead perspective of the bracket of the invention, displaying the deck attachment section of the bracket and the trimmer section of the bracket, including the pivot pin, clevis pin, and spring bar.

Alternately, as shown in FIG. 3, attachment to mower deck 16 can be achieved without an upper deck surface attachment piece 24 having a 90° bend and extending along the upper surface of deck 16, but by merely affixing a deck attachment piece 18 (having no upper surface segment 24) parallel to a side surface of mower deck 16. Bore 34 can still be utilized in such an embodiment.

Figure 4:
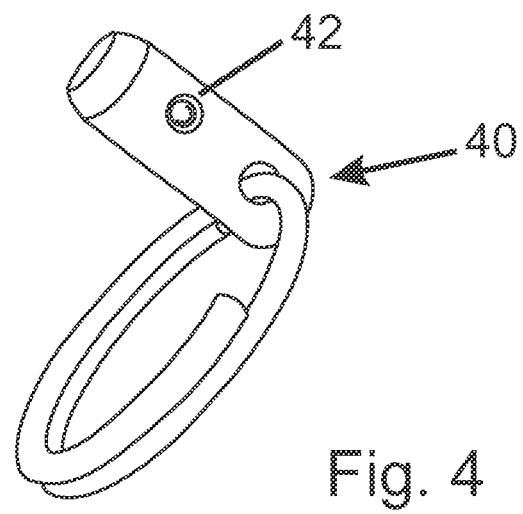
FIG. 4 depicts a clevis pin used to select the rotational axis of the trimmer attachment segment of the bracket by disposing the pin through holes in the trimmer attachment segment and on through the deck attachment segment of the bracket, locking the pin in place with the ball lock shown.
Figure 6:
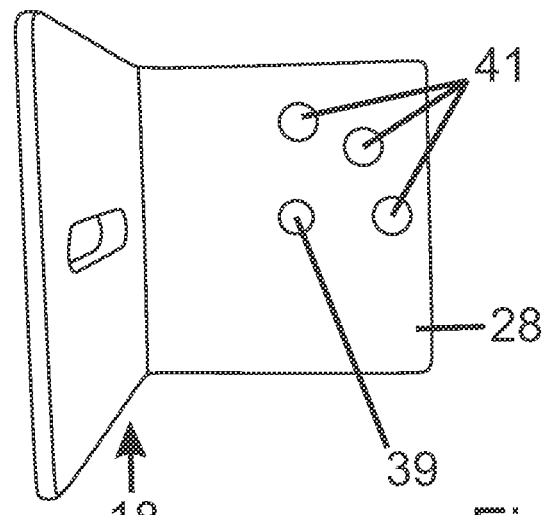
FIG. 6 depicts an upper perspective view of a deck attachment segment of the bracket showing an elongated attachment bore on the portion mounted to the side of a mower deck and a bore for receipt of the pivot pin and multiple bores for receipt of the clevis pin.

As shown in FIG. 3, bracket 12 comprises two segments, a deck attachment piece 18, and a trimmer head attachment piece 20. Pivot pin 38 extends through a bore in trimmer head attachment piece 20, allowing piece 20, to utilize pin 38 as an axis around which to pivot when disposed through a bore 39 in trimmer head attachment piece base 28 upon whose upper surface trimmer head attachment piece 20 is disposed. Clevis pin 40 as also shown in FIG. 4, has a locking ball 42, which secures clevis pin 40 in a selection of bores 41 in piece 28 (after its disposition through a bore in piece 20) through which it can be disposed. By having multiple bores in piece 28 in which clevis pin 40 may be disposed, a user can change the angle at which trimmer head 14 is held from the mower, allowing a user, through such dispositions, to change the overall distance, for example at three different settings, from the mower which the trimmer head will cut vegetation. It is anticipated that a rotational gradient of bores even greater than shown in FIG. 6 could be disposed in piece 28, allowing the clevis pin to be disposed at various angles and distances altering the trimmer's mowing radius by distributing additional bores at greater or lesser radii from axis pin 38. Additionally, it is anticipated that other devices than a simple cotter pin could be disposed in a locking manner to change the radius by altering the location of the locking device, in particular, a lever with a rotational disposed pin or bar could be disposed to allow a user to alter the length of the trimmer from the mower more easily from a seated position.

An easily attachable toggle switch for power to the motor of the trimmer head can be attached by merely placing leads extending from a cable from the trimmer head under the cables on a mower's battery.

Figure 5:
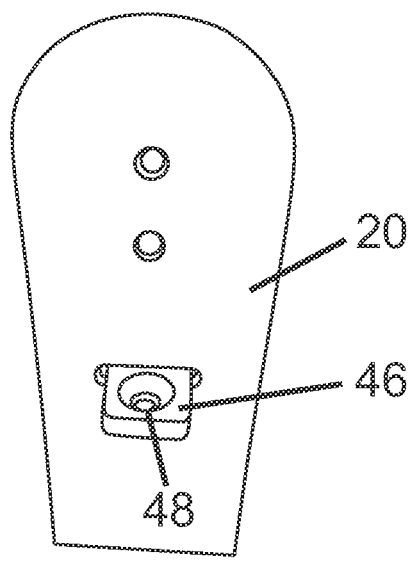
FIG. 5 depicts a front perspective view of the upper surface of the trimmer attachment section of the bracket, specifically displaying bore holes for the pivot pin and clevis pin and the spring bar mount displaying a bore hole therethrough.

Preferably, as shown in FIG. 1, spring 44 is utilized to attach trimmer head 14 to trimmer head attachment piece 20 on spring attachment bar 46. As shown in FIG. 5, bar 46 can be of a piece or attached in a manner known in the industry, including but not limited to welding or a separate piece attached with screw or bolts to trimmer head bracket attachment piece 20 in an essentially perpendicular configuration from an upper surface of piece 20. Bar 46 will preferably have a bore 48 for receipt of an end attachment segment of spring 44, such as bolts and bushings that are securely welded to the inside of the spring, however, spring 44 could be welded onto bar 46 or otherwise attached as known within the art.

Further, the trimmer apparatus is preferably electrically connected to the battery 50 of the mower utilizing a simple toggle switch 52, keyed, or push to turn or the equivalent known in the art for ease-of-use. Preferably, the electrical connection 54 will also use safeguards known in the art such as fuses 56 to prevent fire or other hazards from electrical overload. Overall a trimmer that is safe, easily attachable to an existing mower, that can be easily adjusted for height and extension from the more deck as described herein provide significant advantages over those already known in the art.

We claim:

1. An attachment for adjustably mounting a trimmer head to a lawnmower, said attachment comprising:
    a segmented bracket mounted to the lawnmower, the segmented bracket having a first segment that is mounted to a deck of the lawnmower and a second segment that is attached to the first segment;
    the second segment having a deck side extension portion attached to the first segment and a trimmer head attachment piece base extending at an essentially 90° angle from the deck side extension portion;
    the trimmer head attachment piece base further having a plurality of bores extending therethrough;
    a trimmer head attachment piece mounted at a first end to the trimmer head attachment piece base by a pivot pin that extends through a first of the plurality of bores enabling said trimmer head attachment piece to rotate about a vertical axis relative to said bracket;
    a locking pin extending through the trimmer head attachment piece and a second of the plurality of bores to fix a spacing between said trimmer head and said lawnmower;
    a spring joining an opposing second end of the trimmer head attachment piece to the trimmer head.

2. The attachment of claim 1, wherein the spring, over its entire length, overlies the trimmer head attachment piece.

3. The attachment of claim 1, wherein the first segment of the segmented bracket is attached to an upper deck of the lawnmower.

4. The attachment of claim 3, wherein said first segment of the segmented bracket includes an upper deck portion for attachment to the upper deck of said lawnmower, and a side portion that is hingedly connected to the upper deck portion.

5. The attachment of claim 4, wherein said side portion further includes a height adjustable portion.

6. The attachment of claim 5 wherein the trimmer head attachment piece base is attached to said height adjustable portion to enable adjustment of the trimmer head height relative to the lawnmower.

7. The attachment of claim 1 wherein the locking pin is a removable clevis pin.

8. The attachment of claim 1 wherein a spring attachment bar fixed to the trimmer head attachment piece supports an end of the spring to springedly offset the trimmer head when an obstruction is encountered.

* * * * *